(12) United States Patent
Davis

(10) Patent No.: US 8,108,264 B1
(45) Date of Patent: Jan. 31, 2012

(54) TARGET PRICE SALE APPARATUS AND METHOD

(76) Inventor: Geraldine F. Davis, Toronto (CA)

( * ) Notice: Subject to any disclaimer, the term of this patent is extended or adjusted under 35 U.S.C. 154(b) by 1189 days.

(21) Appl. No.: 11/424,299

(22) Filed: Jun. 15, 2006

(51) Int. Cl.
*G06Q 30/00* (2006.01)
(52) U.S. Cl. ...................... 705/26.3; 705/26.1
(58) Field of Classification Search ............ 705/26, 705/27, 26.1, 26.3
See application file for complete search history.

(56) References Cited

U.S. PATENT DOCUMENTS

| | | | | |
|---|---|---|---|---|
| 7,363,267 | B1* | 4/2008 | Vincent et al. | 705/37 |
| 7,660,745 | B2* | 2/2010 | Everett et al. | 705/26 |
| 7,769,640 | B2* | 8/2010 | Klenske | 705/26 |
| 2001/0049648 | A1* | 12/2001 | Naylor et al. | 705/37 |
| 2003/0083949 | A1* | 5/2003 | Kar | 705/37 |
| 2005/0015308 | A1* | 1/2005 | Grove et al. | 705/26 |
| 2005/0015327 | A1* | 1/2005 | Eshet et al. | 705/37 |
| 2005/0144111 | A1* | 6/2005 | Manstein et al. | 705/37 |
| 2006/0287924 | A1* | 12/2006 | Admon | 705/26 |
| 2006/0293994 | A1* | 12/2006 | Stuart | 705/37 |
| 2008/0010099 | A1* | 1/2008 | Walker et al. | 705/4 |

OTHER PUBLICATIONS

Feldman, Robert et al., "Auctions: A Sampling of Techniques," Finance & Development, Washington, Sep. 1993, vol. 30, iss. 3, p. 32.*

* cited by examiner

*Primary Examiner* — Amee A Shah
(74) *Attorney, Agent, or Firm* — Stephen W. Melvin

(57) ABSTRACT

A method and apparatus allows offering and selling items based on a non-public target price. The target price is initially established in advance for a given item and is not known to potential buyers. Offers for the item are accepted and a transaction is completed if an offer exceeds or is equal to the target price. A target price sale may be conducted in conjunction with a traditional auction. During such an auction-phase, bids are accepted in a traditional manner and the item is sold if the ending bid is higher than a reserve price. The establishment of a target price allows the seller to define an acceptable price in a private sale independent of circumstances, and the non-public nature of the target price allows the seller to control the process. In the case that a traditional auction is also conducted, the existence of both target sale and auction phases can maximize the expected sale price of the item.

17 Claims, 4 Drawing Sheets

TARGET PRICE SALE APPARATUS AND METHOD

FIELD OF THE INVENTION

This invention relates to the field of sales and auctions of items, and more particularly to methods and systems for conducting the sale and auction of one-of-a-kind, collectible, rare and/or scarce items such as fine art.

BACKGROUND

Public and private auctions, whether live, conducted on-line or in some combination are useful for selling items given sufficient interest and attendance. Auctions are by nature of limited duration and in general, an item will sell at an auction just higher than the second highest level of interest in the item, since this is the minimum that the person with the highest level of interest needs to pay. Thus, a seller wanting to maximize the sale price of an item at an auction should insure significant promotion and attendance at the auction. Specific items with a low level of interest during the time period of the auction may sell at an undesirably low price, or fail to meet a reserve price and not sell. Thus, unless there is urgency to selling an item, an auction is an unsatisfactory method for disposing of certain items.

A traditional sale with a fixed known price can alternatively be used for selling items in individual sales when there is no urgency to dispose of items. This is particularly the case with items of fine art that may be unique one-of-a-kind items. Unless and until a seller reaches a level of interest in an item higher than or equal to the offered price an item will not sell. However, a traditional sale typically requires that the seller announce publicly an acceptable price for an item independent of any interest or commitment on the part of a buyer. In this sense, whether or not an item will sell in completely under the control of the buyer. A seller may change the price at any time, but a traditional sale does not afford the seller the benefit of concealing the price at which an acceptable transaction can take place.

Some of the disadvantages of auctions and traditional sales are overcome with a combination of auctions with sales. One method for combining sales with auctions is the "Buy It Now" feature available on the EBAY auction system. Under this system, an item is available for purchase at a specified price during the auction period before the first successful bid. The "Buy It Now" feature does not distinguish between an auction phase and a non-auction phase, except that the "Buy It Now" option is only available until the first successful bid is accepted. Also, the price at which the item can be bought is known to all potential buyers. Finally, the "Buy It Now" price cannot be changed during the auction.

What is needed is an improved method for selling items in which the seller is given maximum flexibility, items can be offered over long periods of time without the disadvantages of an auction and prices can be concealed from potential purchasers.

BRIEF SUMMARY OF THE INVENTION

A method and apparatus are disclosed for offering and selling items based on a non-public target price. The target price is initially established in advance for a given item and is not known to potential buyers. Offers for the item are accepted and a transaction is completed if an offer meets or exceeds the target price. A target price sale may be conducted in conjunction with a traditional auction, in which an auction phase is inserted into the process of accepting offers. During such an auction-phase, bids are accepted in a traditional manner and the item is sold if the ending bid is higher than a reserve price. The establishment of a target price allows the seller to define an acceptable price in an individual sale independent of circumstances, and the non-public nature of the target price allows the seller to control the process. In the case that a traditional auction is also conducted, the existence of both target sale and auction phases can maximize the expected sale price of the item.

DETAILED DESCRIPTION

Figure 1:
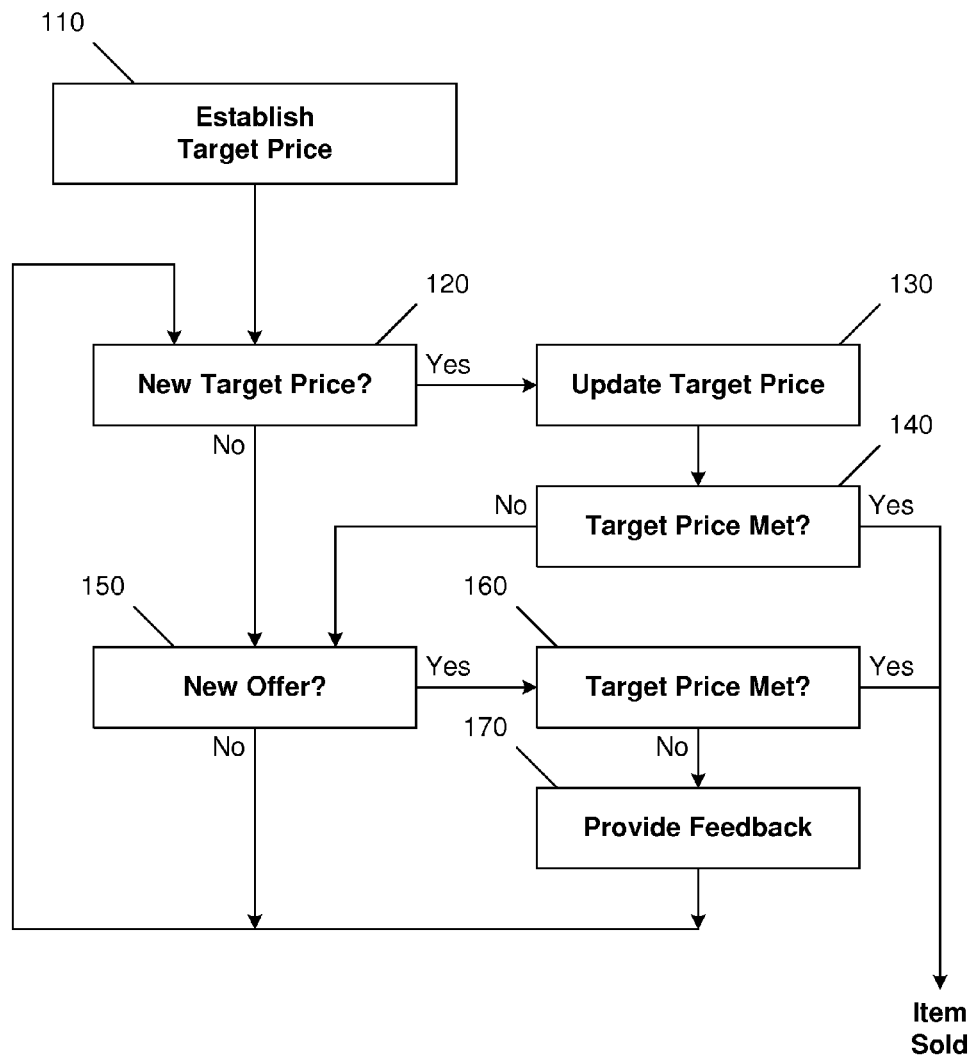
FIG. 1 is a figure illustrating steps of an embodiment of the invention.

A preferred embodiment of the present invention is described in connection with the sale of fine art. One application of the present invention would be to dispose of an estate or a large collection of fine art. However, it will be appreciated to those of skill in the art that the present invention could be used to sell any item, whether individually or in a collection with other items. It will also be appreciated that the methods and systems used to practice the present invention could be automated and conducted using computers, or they could be manual processes implemented in a traditional way.

An important aspect of the present invention is the establishment of a secret target price for each item being offered for sale. The target price is secret, or non-public, in that it is not known to the potential purchaser and in some embodiments the seller may change the target price for any item that has not been sold. The seller may determine the target price on their own, based on their own needs and analysis, or the seller may work with a dealer and/or appraiser to determine acceptable target prices. The target price is a price the seller is willing to accept in a private sale, separate from any auction and regardless of publicity. The target price will typically be high enough that it is difficult to obtain, but it should not be an unrealistic price for the item. In some circumstances, it is important that potential buyers be assured that a realistic target price has been established by a reputable professional in the area, and the practice of certain embodiments of the present invention may rely on this feature.

The mystery about the price at which the item may be obtained allows for a manipulation of the market or at least a more accurate reflection of supply and demand for an item than a traditional auction taking place at one fixed time and place. In particular, a typical auction relies on a limited number of bidders at one time and in one place (even if bidding by phone or over the Internet, they are in one virtual place). If there is not sufficient attendance, the bidding may result in a low price, and the item will often be sold at a low price or not at all. In contrast, the target price sale of the present invention more closely represents a private sale between individuals, the willing buyer "bargaining" with the willing seller who has in advance established a price at which they would be willing to sell. Because the seller's target price is not disclosed, the buyer must discover it by trial and error. The buyer places offers in an attempt to discover or "hit" the target price. Both buyer and seller are desirous of a transaction as opposed to an auction where not all who are present are engaged in the transaction.

In certain embodiments of the present invention, the seller may change the target price to reflect changes in the supply and demand for an item. The ability to change the target price of an item allows this method of sale to adjust to factors of supply and demand (such as in the death of the artist), publicity, promotion, and to reflect any increase or decrease in demand that generally takes place over a period of time. This is a benefit it offers to those who are selling rare or scarce items, such as works of art and collectibles especially, although it could be used for any item one wishes to sell at the optimum price one can obtain. The fact that things can be offered for sale over a considerable period of time, with the incentive created by the target price, makes it more likely that the seller will find a buyer, and at the right price. The seller, not the artificial pressure of auction event and/or its attendance or lack thereof, controls the sale.

In a preferred embodiment, the present invention is used to implement a continuous sale, rather than an auction with a limited and specified duration. The method of selling in a continuous manner allows for changes in the market that may affect the price and value of especially rare, original items like works of art and collectibles. The flexibility of purchase at a point in time that is not fixed allows many more buyers to enter into competition for the right to buy, and for prices to climb over a much longer period without damage to the price, as in an auction where an absence of interest at one point in time may result in the item being sold at a much lower price.

The method of an embodiment of the present invention is more appropriate to high-end items and the people who buy them, who may be too busy to attend a fixed date auction event in one place. These purchases represent long-term decisions by the buyer. While they are making repeated attempts to hit the target price, and watching the results, they are becoming more invested in the idea of making this purchase, thereby convincing themselves to try again by bidding higher. If they miss the target, and lose the opportunity because the item is sold to someone else, they may be motivated to try gain on another item. In certain embodiments, it becomes fun, a sort of game, and a kind of "treasure hunt". There are many situations in which the value of a work of art, for example, may change quite a lot over time, and the target price could possibly be changed, so a potential purchaser is not sure what offer will result in a successful transaction.

In some embodiments of the invention, it may be desirable to only allow changes to the target price according to a set of rules that would be fully disclosed to the participating buyers and to the public. In some embodiments potential buyers may make offers to buy that last over many different days or months and there may be circumstances where transactions are temporarily suspended when important news that relates to the value of an item is announced.

One key to the certain embodiments of the present invention in their ability to attract buyers is the buyers' confidence in the legitimate establishment of the target price. The potential purchaser has confidence that the target price that has been established reflects a reasonable price for the item in question.

An embodiment of present invention could be used by any individual retailer, any individual or company, or any kind of seller of art on their own web site or in a traditional (non-Internet-based) sale in their premises or in an auction house, with or without use of a computer, in any kind of sale in any setting, with or without a web site. Target prices could be conveyed by many means (e.g. registered mail, third party to lawyer or a newspaper advertising section with/without a future deadline-whatever will assure their buyers belief that the target price was actually established prior to offering it for sale). The newspaper or any public or legal third party could offer some visual or legal proof of prior receipt of the target price information. Putting the target prices into a safe deposit box where the date of access is recorded by the bank which houses the safe deposit box-prior to offering it for sale-would be legal proof and not involve disclosing the actual figures to more than one party, except the seller.

There are also many computerized applications than can accomplish a third-part registration of a secret target price. In some embodiments of the present invention, a target price server connected to the Internet could be used to securely receive a target price and store it in a local database. Public key encryption and verifiable time stamps can be used to establish after a successful offer has been received that the target price was indeed previously transmitted to the target price server at a certain point in time. In certain embodiments of the present invention, an offer higher than the target price will result in the item being sold at the lower target price. In these cases it may be important to establish that the target price existed prior to the offer so the buyer is assured that no manipulation of the target price occurred after the offer was received. Even in the case of offers lower than and up to the target price, if multiple individuals are competing for an item, it may be important to establish that manipulation of the target price did not occur since such manipulation could result in preferential treatment of certain potential purchasers over others.

The method of arriving at the target price should involve some research on the part of the seller. A process similar to an appraisal or professional evaluation would precede the establishing of the target price in order to ensure the likelihood of its effectiveness. This would entail more than just the seller knowing the target price.

In many cases, it is important to the seller that the target price is kept confidential. One example of when this is important is when the seller does not want the target price to establish a public value of the item in question. An important feature of some embodiments of the present invention is the ability to conduct a public sale while not having to disclose the price at which an acceptable transaction will occur.

While it may be important that the target be kept truly confidential, in most cases more than one person will know what it is. The other person usually will be the vendor or someone employed by the vendor who is inputting the information into the computer or any manual forms used in the process. These individuals would typically be agreeing to confidentiality as terms of their employment. Those of skill in the art will appreciate that there are many alternative means of establishing, maintaining in confidence and conveying where necessary, the target price. A variety of mechanisms known to those of skill in the art, both computerized and manual, are possible to ensure that target prices have been established, that they are being honored and that they have not been disclosed to third parties.

Once the target price is established, the seller is committed to accept an offer when that price is reached. However, in some embodiments of the present invention, the seller is allowed to change the target price by going through certain procedures. In certain cases it may be desirable to establish specific procedures and only allow changes the target price at certain times. In other embodiments of the present invention, it may be desirable to allow the seller to change the target price for any reason at any time, as long as no successful bids have been received. The possibility of changing the target price would ensure viability if items are offered for sale by this method over longer periods of time.

There are numerous examples of situations in which one might wish to change the target price. For example, the death of the artist or a big or high sale of another work by the artist. In particular, the value of an item can change when a substantial number of works comes on the market or one particular work sets a new price for the artist at auction or sale (perhaps even another work on the same web site or in the same event). The change in rarity, scarcity or demand may be another reason that prices should be adjusted.

Another example that may require adjustment to the target price is the death of the owner/seller of the item(s), or when the owner gives the items in question to another party or a charity for sale. In the case of an estate, a family member may not wish to sell the items at the previously established target price. The items may be withheld until the estate is settled, and then put back on the market at the same or different target price at that time. In such circumstances, it may be desirable to keep a list of interested buyers in line for when items come back. In cases when target prices are being adjusted, this fact can be made public while offers are still accepted. Such an offer, "without target," will not result in a sale transaction, but the highest offer could be given another shot at the item when the target is re-established and the item is put back up for sale. This could be as simple as notification to the previous potential purchasers, or to only to those with the highest offers, hence the possibility of recording offers during the period of re-establishing of target price. Such a system would allow the momentum with the buyers to be maintained whether the target adjustment is really a taking off and putting back on the market or just an adjustment.

Another example of when target price adjustments may be desired is that of rapidly escalating bids. In particular, the seller may see rapidly escalating bids by way of monitoring the history of offers for an item, and may want to raise the target price due to such evidence of increased demand, as long as no successful bid has been received. In certain embodiments, this may require a period in which no offers are accepted and may require notification to potential purchasers. This allows the seller of the item to take advantage of any shifts/trends in the market to their advantage in a way similar to the marketing of equities in the stock market.

The present invention may be used by any estate, any individual selling things, liquidators, even trustees in bankruptcy, charities that sell art/other items to raise money. It could be used in fundraising even where non-art items such as sponsorships, awards, and patronage of any kind is "auctioned" or "sold" to the donor of such funds, e.g. a hospital ward named after the donor, the sponsorship of a theatrical event, an art exhibition/catalogue, a university scholarship/award, etc.

FIG. 1 illustrates steps in an embodiment of the present invention. In step 110 the target price is established for a particular item, and in some cases this target price is registered or stored in a target price repository or server. Step 120 determines if an adjustment to the target price needs to be made. If an adjustment needs to be made, the flow continues to step 130, in which the target price is adjusted, otherwise the flow continues to step 150. After step 130, step 140 is performed, in which, a determination is made as to whether the new target price causes any pending offer to meet the target price. If so, the item will then be sold, if not the flow continues with step 150. In step 150, a determination is made on whether a new offer has been submitted. Offers may be submitted manually or electronically. In a preferred embodiment, items are described on a web site and offers are submitted electronically. If a new offer has been submitted, step 160 will compare the new offer with the target price. If the new offer is equal to or greater than the target price, the item has been sold and a transaction is initiated which will complete the sale of the item. If the new offer is less than the target price, or if there is no new offer, the flow continues with step 170, in which feedback is optionally provided to the person making the new offer, then the method returns to step 120. Steps 120, 130, 140, 150, 160 and 170 are repeated in this manner until the item is sold or is taken off the market, or until the item is placed into an auction or pre-auction phase as described below.

In certain embodiments of the present invention, step 130 may involve a delay in which certain notifications are made and during which no new offers are accepted for a period of time. In certain embodiments, step 170 may involve a database operation in which a history of offers is consulted and updated. An offer that is lower than the target price may expire instantly, or the potential purchaser may be able to specify a period of time in which the offer is open. For example, the potential purchaser may say that the offer is good for 24 hours. In such an embodiment, it may be possible for the seller to adjust the target price down to the offer price during the time the offer is good such that a sale is made. Even in cases of unsuccessful offers that have expired, it may be desirable in certain embodiments to maintain a database of previous offers so that step 170 can consult this database in responding to new offers, and in responding to changes in the target price.

In some embodiments of the present invention, the existence of other offers and the highest unsuccessful offer made so far is disclosed publicly to all who are participating in the process. In other embodiments, potential purchasers have no information about other offers and no information about how high other unsuccessful offers have gotten. In still other embodiments, a type of partial disclosure is possible.

One type of partial disclosure that might be optional but could be very productive is as follows. Without any disclosure, a would-be buyer is making offers for a work with no knowledge of how high they may have to go. They could become frustrated or bored with the process if they have to enter too many offers without any indication of how high the target might be. A partial disclosure option would be to allow a message such as "seven higher offers have failed to reach the target price", "three higher offers have failed to reach the target price," or "yours is the highest offer received so far." This sort of indirect feedback gives the potential purchaser an immediate indication of where they stand and still does not reveal the target price. Thus, the excitement and momentum are maintained, no time is wasted and the bidder who has the courage may actually succeed in obtaining an item they wish to buy where they may have failed or given up due to the absence of any indication or information about the price. The partial disclosure could also take into account how recent other unsuccessful offers have been and treat them accordingly in creating feedback. This would allow messages such as "the most recent higher offer was received seven days ago," or "the most recent higher offer was received three minutes ago." A historical database of offers can thus be used in step 170 to implement such a partial disclosure option, as well as others such as are apparent to those of skill in the art.

A characteristic of the present invention is that it may be combined with a traditional auction. In such a combination, a non-auction phase would operate according to the steps described above in connection with FIG. 1, and an auction phase would interrupt this sequence and in the event that the item does not sell during the auction phase, it would return to this sequence. During such an auction phase, a reserve price would be established and the item would be sold in accordance with a typical auction process. Note that the reserve price established in advance of the auction phase would typically be different than the target price. The reserve price is established as the minimum the seller is willing to accept within the context of an auction, which may assume a certain level of promotion and attendance, and may be negotiated with the entity conducting the auction. In many circumstances the reserve price will be lower than the target price. Furthermore, the reserve price may be known to the public, and may be known to dealers in advance of the auction.

Figure 2:
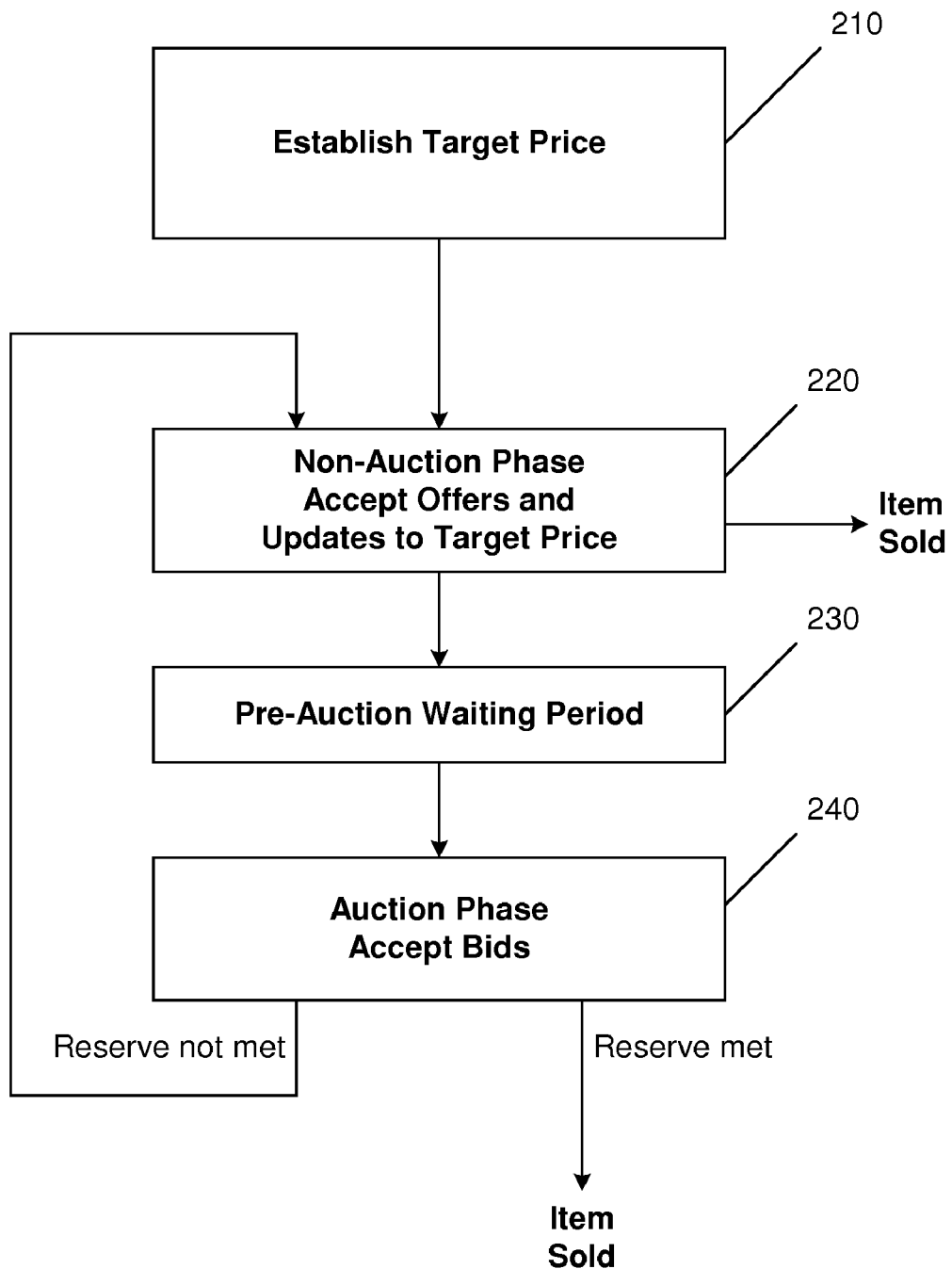
FIG. 2 is a figure illustrating steps of an embodiment of the invention in which an auction phase is utilized.

FIG. 2 illustrates steps in an embodiment of the present invention in which an auction is conducted. In step 210, the target price is established for an item, such as was described above in connection with step 110. Step 220 refers to the non-auction phase and can be implemented by steps similar to 120, 130, 140, 150, 160 and 170 as described above. During this phase offers for an item are accepted and updates to the target price may be processed. If an item is not sold during the non-auction phase, it may be placed up for auction in step 240. Step 240 is conducted as a traditional auction and may be a live auction, an on-line auction or any combination. Step 240 operates for a specified duration and at the end of the auction, if the highest bid exceeds the reserve price, the item is sold. If an item receives no bids, or no bids over the reserve price, then the item is returned to the non-auction phase and the flow continues with step 220. In certain cases it may be desirable to update the target price based on the outcome of the auction, including the results from other related items. For example, the successful and unsuccessful sales of works of art by an artist may dictate changes to the target prices of other works by that artist, including items that were not in the auction.

In certain embodiments, there may be an intermediate step 230 between steps 220 and 240 as a pre-auction waiting step. In such a step, an item would no longer available for purchase through an offer in step 220. In certain cases it may be necessary to guarantee that items will in fact be unsold and available for an auction so that proper promotion can be made and therefore a pre-auction period would be necessary. The time when an item goes from step 220 to step 230 could be disclosed in advance to potential purchasers. The fact of an impending cut-off time when an item will no longer be available for purchase, at least until after an auction and in the event of not being successfully sold at the auction, would create an urgency and could be exploited to increase the likelihood that items will receive successful offers outside the auction.

Figure 3:
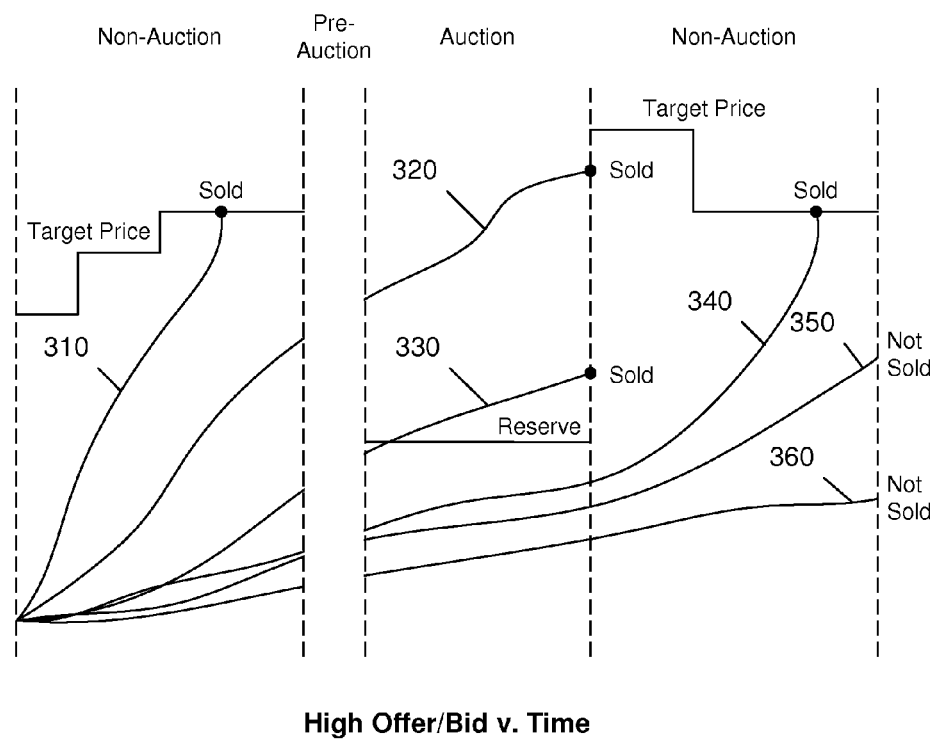
FIG. 3 is a graph of high bid/offer versus time for an embodiment of the present invention.

FIG. 3 illustrates a graph of high offer/bid vs. time for an embodiment of the invention such as that discussed above in connection with FIG. 2. Six different scenarios are illustrated in FIG. 3 with respect to how the high offer/bid for an item could progress over time and when and if the item would be sold. In the case of curve 310, an item receives successively higher offers and sells during the first non-auction phase, even in the face of a rising target price. In the case of curve 320, an item does not sell during the first non-auction phase, but sells at the auction at a price higher than the previous target price. In the case of curve 330, the item sells at the auction at a price lower than the previously established target price. Curve 340 illustrates a scenario in which an item failed to meet the reserve price during the auction phase, but is sold in the second non-auction phase after a target price is adjusted to a lower price. Curve 350 illustrates a scenario in which an item remains unsold at the end of the second non-auction phase, even after receiving an offer that is higher than the reserve price established for the auction. Finally, curve 360 illustrates a scenario in which an item remains unsold at the end of the second non-auction phase and has received no significant bids or offers.

It is expected that in a collection of items, some items will sell during the non-auction phase and some will not. The tension between the non-auction phase and the auction phase serves to increase the return to the seller. Some buyers will make offers that meet the target price during the non-auction phase, thereby completing a sale, when they might have otherwise been able to acquire the item at a cheaper price during the auction, because the reserve price is lower. However, the potential purchaser who waits for the auction phase takes the risk that the item may sell for more than the target price, because the purchaser is then competing with other potential buyers in an auction context. In some situations, an item will sell at an auction that would otherwise not have sold during a non-auction phase.

Figure 4:
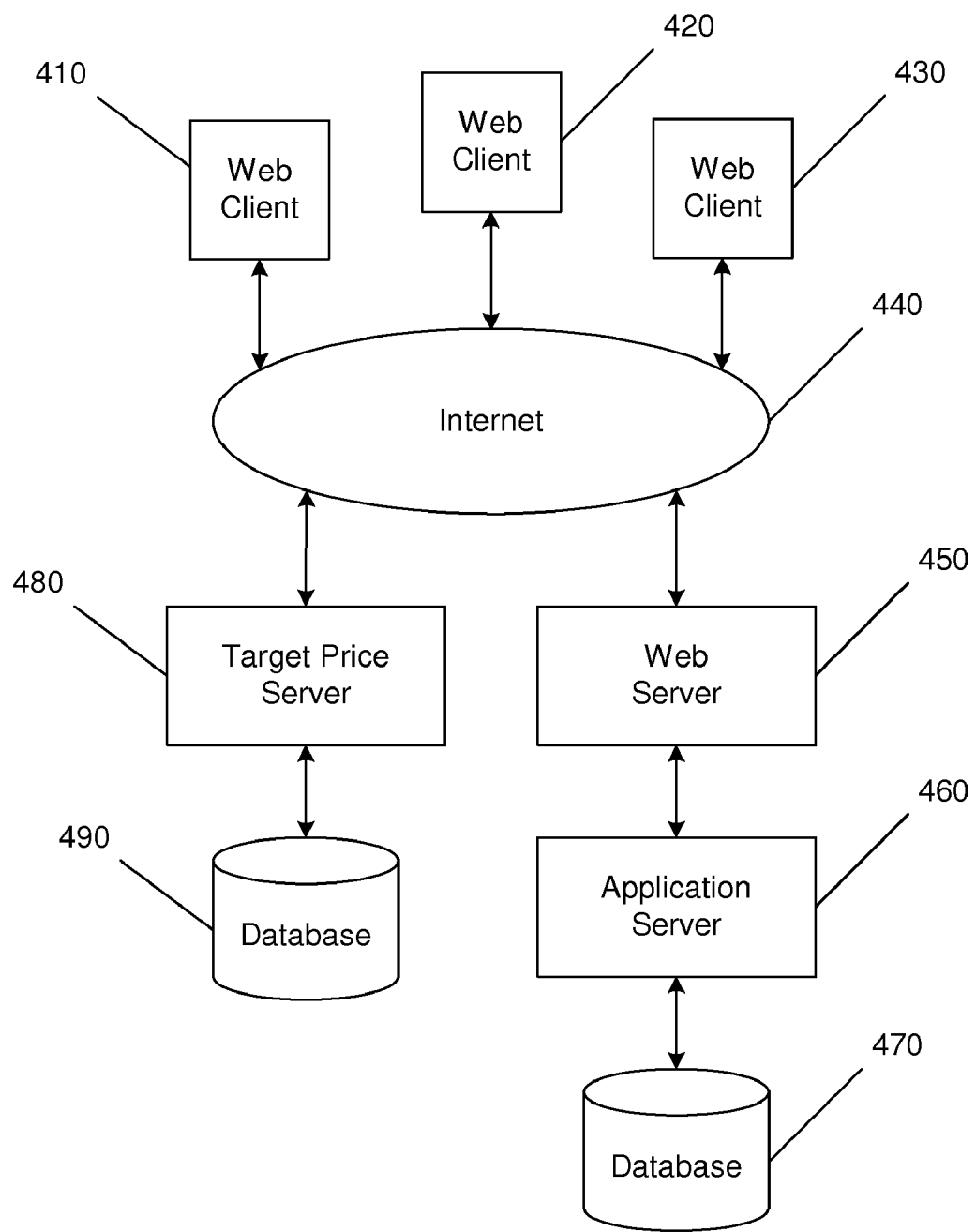
FIG. 4 illustrates an apparatus for practicing an embodiment of the present invention.

FIG. 4 illustrates an embodiment of the present invention in which items may be described and offered, and transactions can be completed using the public Internet. Web clients 410, 420 and 430 are computers with Web browser software able to be connected to the Internet 440. Web server 450 is a server containing web pages that describe items being offered for sale and/or auction. Web server 450 operates in conjunction with application server 460 and contains information concerning the sale and/or auction process, how to register to make an offer or a bid, etc. Database 470 is utilized to maintain information concerning the offers and bids made and may be updated in real-time as offers and bids are accepted. Target price server 480 maintains database 490 of target prices for items being offered for sale. In some embodiments target price server 480 and database 490 may be incorporated into web server 450, application server 460 and database 470. A seller and/or vendor communicates with target price server 480 to update target prices of items, and application server 460 communicates with target price server 480 to query target prices for items. Communication with target price server 480 is preferably encrypted to protect the confidentiality of the target prices. Further, target price server may implement a digital signature and time stamp system in which target prices submitted by a seller or vendor may be provably verified upon request.

FIG. 4 illustrates a system that may be utilized during a non-auction phase or an auction phase or both. It will be appreciated by those of skill in the art that in certain cases only one of the phases may utilize a system such as in FIG. 4. For example, it may be desirable to conduct the non-auction phase over the Internet such as in FIG. 4, while the auction phase may be conducted as a traditional live auction.

In the event that the seller wishes to further promote the sale and/or auction by actually exhibiting the actual items being sold, through a computerized or broadcast auction of any kind, the items for sale could be circulated ahead of time or shown simultaneously in a number of places and then rotated to the various places so that all potential purchasers could see all the works either ahead of time or simultaneously while the sale and/or auction is under way. Exhibiting the works ahead of time would allow potential purchasers to decide which works he or she desires the most, establishing a wish list from which they would work once sale and/or auction process begins. If time or money does not permit, only a few sample works could be exhibited in each location, as examples of the quality of the group and people have to judge from photographs on the internet or other media what the other works might look like. The works exhibited in various venues in various cities or places could be rotated over time so that every sees everything in the various places.

When dealers are involved, potential purchasers may be assigned to various dealers or auctioneers by territory or simply divided based on other criteria, and potential purchasers outside of these specified territories or not covered by the criteria might be handled directly by the seller or by the estate or owners of the items being sold. Percentages in the retail art business are typically in the range of 40% to 50% and percentages in auction houses are typically in the range of 10% to 15%. The opportunity to create a different percentage of commissions may exist due to the increased business created by both the method and the competition for the item that may be greater as a result of the practice of the present invention.

Publicity and promotion which may be greater than that which attends a private show in one private gallery and may draw buyers not previously known the various dealers, bringing both new sales and new clients. Therefore, in certain cases it may be possible to offer a lower commission, making it more attractive to the seller. This is particularly the case of an artist's estate where there are a limited number of works available and the executors or beneficiaries are less able to judge the values of the works or the viability of the dealers, etc. The sellers do not necessarily have to pay 50% of the proceeds of sale which could well deprive them of the very best works only, sometimes at prices that are too low, leaving them with the less desirable works, or less marketable items still to sell. While sacrificing a smaller commission, which may not result in any sale or therefore loss of goods to sell, they can test the market before committing themselves either to a dealer or to the sale of a large number of works (which might happen in an auction) at too low a price. The target price can be adjusted to reflect the demand for an artist's works or for the items being sold and nothing will be sold at too low a price with the damage to the future prices that would sometimes cause.

The above description and teaching is specific to various implementations of the present invention, and it should be clear to the skilled artisan that there are many alterations and amendments that might be made to the example provided, without departing from the spirit and scope of the invention.

The invention claimed is:

1. A computer implemented method for offering an item for sale over an electronic network comprising the steps of:
   providing a database on a server coupled to said electronic network;
   storing in said database a predetermined target price for said item, wherein said target price is not publicly known, and wherein said target price represents a minimum and a maximum sale price for said item;
   storing in said database data representing the status of said item, wherein said data comprises at least a portion of a history of offers for said item;
   after said step of storing a target price, receiving over said electronic network an offer for said item, wherein said offer comprises an offer price;
   modifying information in said database based on said offer;
   initiating a transaction over said electronic network to sell said item at said target price, if said offer price is equal to said target price; and
   initiating a transaction over said electronic network to sell said item at said target price, if said offer price is greater than said target price.

2. The method of claim 1 further comprising the step of: adjusting in said database said target price after said step of receiving an offer.

3. The method of claim 1 wherein said offer further comprises an expiration time.

4. The method of claim 1 further comprising the step of:
   communicating an unsuccessful offer result over said electronic network, if said offer price is less than said target price.

5. The method of claim 4 wherein said unsuccessful offer result is based on the number of offers previously accepted that are higher than said offer price.

6. The method of claim 4 wherein said unsuccessful offer result is based on the time of the last higher unsuccessful offer.

7. The method of claim 1, wherein said step of receiving takes place during a first non-auction phase, further comprising the steps of:
   storing in said database a reserve price for said item, wherein said reserve price represents a minimum sale price for said physical item during an auction phase; and
   after said step of storing a reserve price, receiving a bid for said item during said auction phase, wherein said auction phase is distinct from said non-auction phase, and initiating a transaction over said electronic network to sell said item if the highest bid received during said auction phase is equal to or higher than said reserve price.

8. The method of claim 7, further comprising a pre-auction waiting period after said first non-auction phase and before said auction phase during which no offers are received for said item.

9. The method of claim 7 further comprising a second non-auction phase if the highest bid accepted during said auction phase is less than said reserve price.

10. A system for offering an item for sale over an electronic communication network comprising:
    a server coupled to said electronic communication network;
    a storage medium coupled to said server storing data related to said item, including:
      a predetermined target price for said item, wherein said target price is not publicly known, and wherein said target price represents a minimum and a maximum sale price for said item; and
      at least a portion of a history of offers for said item; and
    wherein said server is adapted to receive an offer over said electronic communication network, wherein said offer comprises an offer price, wherein said server initiates a transaction to sell said item at said target price, if said offer price is equal to said target price, and wherein said server initiates a transaction to sell said item at said target price, if said offer price is greater than said target price.

11. The system of claim 10 wherein said server is further adapted to receive an adjustment of said target price.

12. The system of claim 10 wherein said offer further comprises an expiration time.

13. The system of claim 10, wherein said first server is adapted to communicate an unsuccessful offer result if said offer price is less than said target price.

14. The system of claim 13, wherein said unsuccessful offer result is based on the number of offers previously accepted that are higher than said offer price.

15. The system of claim 13, wherein said unsuccessful offer result is based on the time of the last higher unsuccessful offer.

16. The system of claim 10, wherein:
    said storage medium stores a reserve price for said item;

said first server receives said offer during a first non-auction phase and is configured to receive a bid for said item during an auction phase, wherein said auction phase is distinct from said first non-auction phase; and said first server is configured to initiate a transaction to sell said item if the highest bid accepted during said auction phase is equal to or higher than said reserve price.

17. The system of claim 16, wherein a second non-auction phase follows said auction phase if the highest bid accepted during said auction phase is less than said reserve price.

* * * * *